J. C. KEEBLER & R. I. SIBLEY.
ADJUSTING MECHANISM FOR FRUIT AND NUT SIZERS.
APPLICATION FILED FEB. 24, 1915.
1,170,449.   Patented Feb. 1, 1916.
2 SHEETS—SHEET 1.
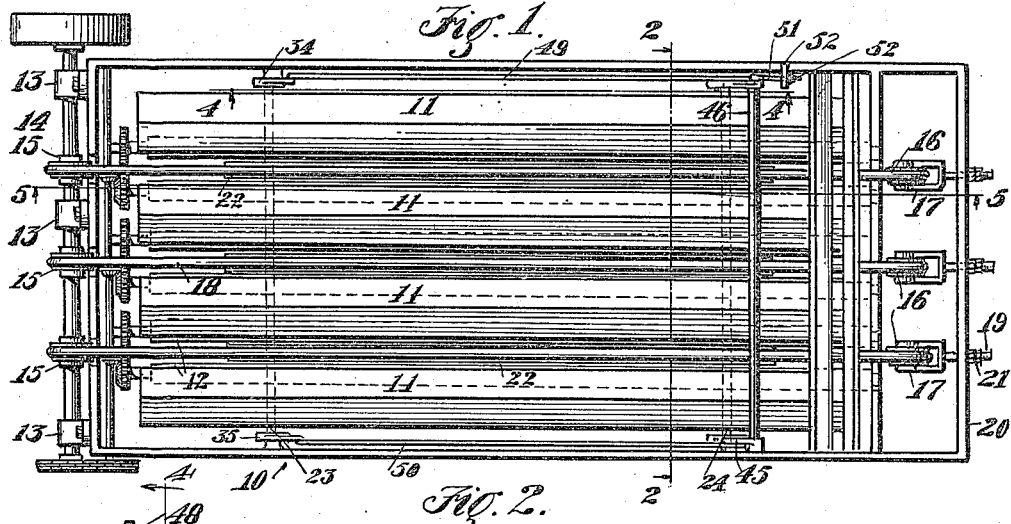
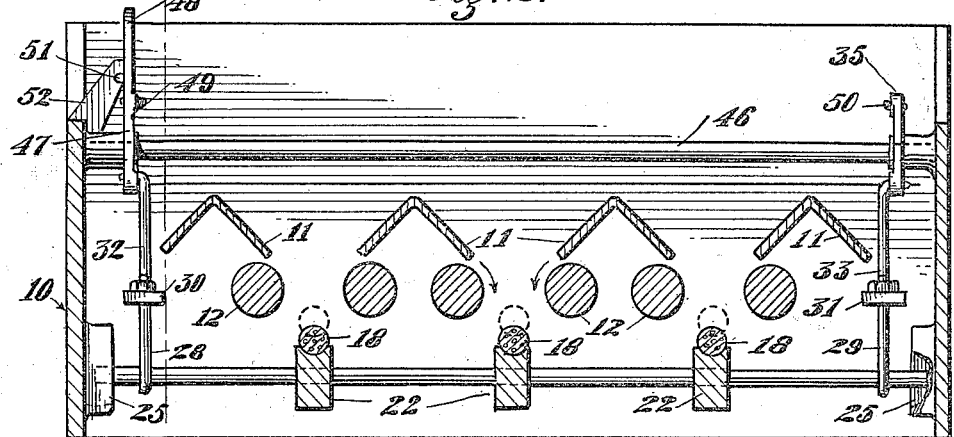
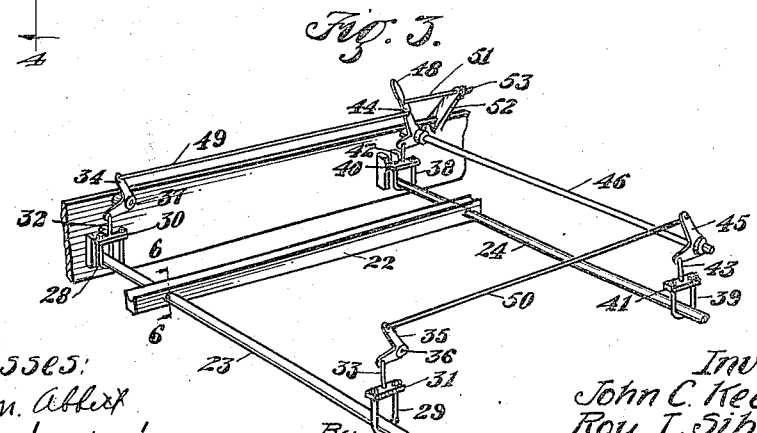
Witnesses:
James M. Abbett
Marguerite Bates
Inventors,
John C. Keebler
Roy I. Sibley
By Edward R. _____
Atty.

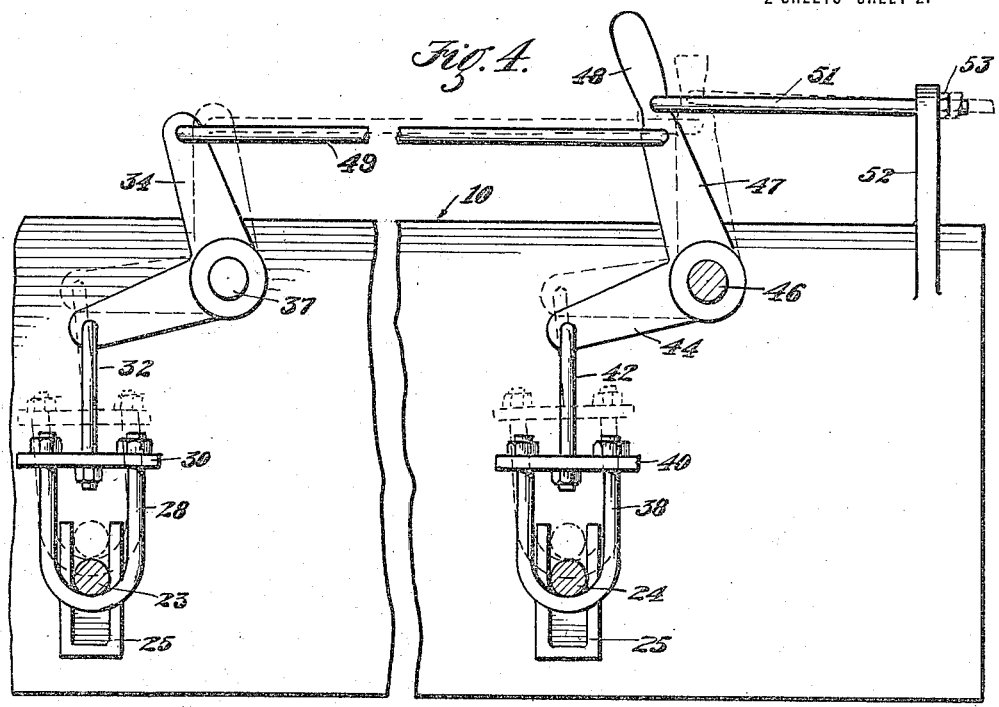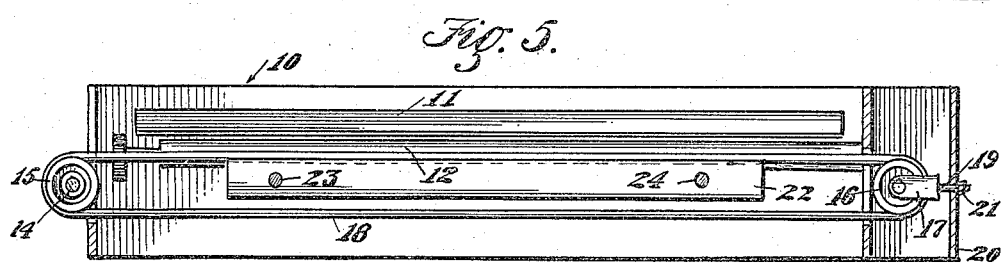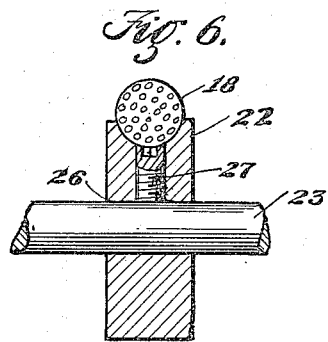

UNITED STATES PATENT OFFICE.

JOHN C. KEEBLER, OF BLOOMINGTON, AND ROY I. SIBLEY, OF GARDENA, CALIFORNIA, ASSIGNORS TO CURTIS OLIVE CORPORATION, OF BLOOMINGTON, CALIFORNIA, A CORPORATION OF CALIFORNIA.

ADJUSTING MECHANISM FOR FRUIT AND NUT SIZERS.

1,170,449.      Specification of Letters Patent.      Patented Feb. 1, 1916.

Application filed February 24, 1915. Serial No. 10,174.

*To all whom it may concern:*

Be it known that we, JOHN C. KEEBLER, a citizen of the United States, residing at Bloomington, in the county of San Bernardino, State of California, and ROY I. SIBLEY, a citizen of the United States, residing at Gardena, in the county of Los Angeles, State of California, have invented new and useful Improvements in Adjusting Mechanism for Fruit and Nut Sizers, of which the following is a specification.

This invention relates to a fruit and nut sizer and particularly pertains to an adjusting device therefor.

In the ordinary types of machines for grading and sizing fruits and nuts, and particularly the class of machine employed in grading olives, the olives are delivered to a series of open-bottomed runways having conveyer belts disposed below and spaced from agitating rollers arranged beneath the runways on opposite sides thereof; the conveyer belts being spaced from the rollers to permit fruit of certain sizes to pass between the belt and rollers, while the larger fruit is carried along the runways and discharged therefrom. In large operations a series of these runways and conveyer belts are provided, and the belts are separately adjustable so as to vary the grading space according to the size of the fruit it is desired to pass therethrough. This requires the expenditure of considerable time and labor and shutting down of the grader is necessary in order to adjust the grader for separating fruit of a different size than that previously handled.

It is the object of this invention to provide means whereby a large number of the conveyer belts may be quickly adjusted in one operation without necessitating stoppage of the grader.

A further object is to provide a mounting for the conveyer belts beneath the graded runways, by means of which the horizontal plane of travel of the upper leaf of a plurality of belts may be accurately adjusted simultaneously, and which is adapted to be applied to most graders of the above type now generally in use.

The invention is illustrated in the accompanying drawings, in which: Figure 1 is a plan view of the grader showing the invention as applied. Fig. 2 is an enlarged detail section on the line 2—2 of Fig. 1, as seen in the direction indicated by the arrows. Fig. 3 is a detail in perspective, with parts broken away, showing the adjusting mechanism. Fig. 4 is an enlarged detail section and elevation on the line 4—4 of Fig. 2, as seen in the direction indicated by the arrows. Fig. 5 is a detail section on the line 5—5 of Fig. 1. Fig. 6 is a detail section on the line 6—6 of Fig. 3, as seen in the direction indicated by the arrows.

More specifically, 10 indicates a frame which may be of any suitable construction and is here shown as rectangular in form and as provided with a plurality of angular slats 11, extending longitudinally of the frame 10 and spaced suitable distances apart with their convergent edges uppermost, forming open-bottomed runways for the reception of the fruit or nuts to be graded.

Extending longitudinally beneath the slats 11 are agitating rollers 12, which rollers are arranged to project a short distance beyond the edges of the slats 11, and are thus arranged in pairs on opposite sides of the opening or space between the slats 11.

Mounted in suitable bearings 13 at one end of the frame 10 and extending transversely thereof is a shaft 14, and mounted on the shaft 14 is a series of pulley wheels 15, spaced apart and arranged to position a pulley wheel 15 in alinement with the center of a space between the slats 11. Corresponding pulley wheels 16 are mounted on adjustable yokes 17 at the end of the frame 10 opposite the pulley wheels 15, and passing around the pulley wheels 15 and 16 are conveyer belts 18, preferably formed of rope, the belts 18 being maintained taut by adjusting the yokes 17, which yokes are formed with threaded stems 19, passing through a rail 20, carried by the frame 10, having nuts 21, the turning of which will advance or retract the yoke 17.

The upper leaf of each belt 18 extends longitudinally of the space between the slats 11 centrally thereof, and are disposed slightly beneath the rollers 12 and spaced therefrom, as particularly shown in Fig. 2, to form gaps or spaces between the belt and the rollers, through which the fruit of a diameter less than the width of the space or gap may fall.

As a means for maintaining the upper leaf of the belt on a horizontal plane and preventing sagging of the same, this leaf of the belt is run in a channel formed on a supporting bar 22.

The present invention resides in so mounting the supporting bars 22 that a plurality of these bars may be adjusted vertically in one operation to vary the relation of the belt 18 with the rollers 12 and thereby vary the width of the gaps or spaces therebetween, according to the size of the fruit it is desired to pass through such gaps. The mounting of the supporting bars 22 is here shown as consisting of a pair of spaced rods 23 and 24, the ends of which project into and are slidable in vertical guide-grooves or channels 25, formed on the inner longitudinal walls of the frame 10; the rods 23 and 24 extending transversely of the frame 10 and passing through transverse apertures 26 formed in the bars 22. The bars 22 are thus adjustable longitudinally of the rods 23, so that they may be readily positioned centrally of the openings between the slats 11; the bar 22 being held against movement on the rods 23 and 24 by means of set-screws 27, as particularly shown in Fig. 6.

The outer ends of the bar 23 are supported upon U-shaped hangers 28 and 29, which are connected to plates 30 and 31, suspended by means of rods 32 and 33, from horizontally extending arms of bell crank levers 34 and 35, pivoted at 36 and 37 on the side rails of the frame 10, as particularly shown in Figs. 3 and 4.

The rod 24 is supported at its ends on hangers 38 and 39, mounted on plates 40 and 41, suspended by hangers 42 and 43 from the horizontal arms of bell crank levers 44 and 45. The bell crank levers 44 and 45 are mounted on a rock-shaft 46, pivoted in suitable bearings on the side rails of the frame 10; the bell crank lever 44 having an upwardly extending arm 47, terminating in a handle 48, by means of which the rock-shaft 46 may be manually actuated. The upwardly extending arms of the bell crank levers 44 and 45 are connected to the upwardly extending arms of the bell crank levers 34 and 35 by means of connecting rods 49 and 50, in such manner that a rocking movement of the bell crank lever 44 will operate through the shaft 46 to actuate the bell crank lever 45 and will also operate through the connecting rods 49 and 50 to rock the bell-crank levers 34 and 35 synchronously with the movement of the bell crank levers 44 and 45.

As a means for limiting the movement of the bell crank levers, a rod 51 is attached to the arm 47 of the bell-crank lever 44, and passes through an opening in a bracket 52, supported on the frame 10; the rod 51 being threaded on its outer end and provided with nuts 53, adapted to engage the bracket 52, to hold the rod 51 and its connections against movement.

In the operation of the invention the fruit to be sized or graded is delivered to the spaces between the slats 11 in any suitable manner, and the belts 18 are rotated by driving the shaft 14 from any suitable source of power, and the rollers 12 are rotated in the direction indicated by the arrows in Fig. 2, by means of suitable gear connections with the shaft 14. The fruit of diameters smaller than the width of the space between the belts 18 and the rollers 12 passes through these spaces and is conveyed in any desired manner to a suitable point. Such fruit as is too large to pass through the spaces between the belts 18 and the rollers 12 is advanced along the runways by the action of the belt, being turned or agitated by the rollers 12 so as to insure the narrower portions of the fruit being positioned transversely of the spaces or gaps during the transit of the fruit from one end of the runway to the other. When it is desired to vary the width of the gaps, the nuts 53 are loosened and the hand lever 48 operated to actuate bell-crank levers 34 and 35, 44 and 45, as above described, simultaneously to raise or lower the rods 23 and 24 so as to vary the horizontal plane of the belt supporting bars 22; the nuts 53 being tightened against the bracket 52 when the desired adjustment has been effected. By this construction any number of the bars 22 can be adjusted vertically by a single operation, thus doing away with the usual set screw construction, necessitating the separate adjustment of each bar 22. By this arrangement the stoppage of the grader is not necessary, as the required adjustment may be made in a few moments of time and while the machine is in operation.

While the invention is shown as applied to a grader having a series of three runways, it is manifest that in practice the number may be largely increased, as in plants where grading and sizing of fruit and nuts are carried on a large scale, the graders are usually formed with fourteen runways and fitted with a corresponding number of belt-supporting bars 22, carried by a pair of the parallel rods 23 and 24.

What we claim is:

1. In a fruit and nut sizer, the combination with a runway having an open bottom, of a conveying belt mounted to travel longitudinally beneath the open bottom of the runway, rolls disposed with their axes parallel to said belt and spaced therefrom so as to permit the passage of fruit or nuts therethrough, a vertically adjustable bar mounted to support the upper leaf of said belt, a hand lever, and means operable on said lever for adjusting the spaced relation of said bar and rolls.

2. In a fruit and nut sizer, the combination with a runway having an open bottom, of a conveying belt mounted to travel longitudinally beneath the open bottom of the runway, rolls disposed with their axes parallel to said belt and spaced therefrom so as to permit the passage of fruit or nuts therethrough, a vertically adjustable bar mounted to support the upper leaf of said belt, a hand lever, means operable on said lever for adjusting the spaced relation of said bar and rolls, and means for locking said bar in various adjusted positions.

3. In a fruit and nut sizer, the combination with a runway having an open bottom, of a conveying belt mounted to travel longitudinally beneath the open bottom of the runway, rolls disposed with their axes parallel to said belt and spaced therefrom so as to permit the passage of fruit or nuts therethrough, a vertically adjustable bar mounted to support the upper leaf of said belt, a hand lever, means operable by said lever for adjusting the spaced relation of said bar and rolls, and means operable on said hand-lever for locking same against movement to hold the supporting bar and belt in various adjusted positions.

4. In a fruit sizer and grader, the combination with an open bottomed runway, of a belt positioned to travel longitudinally beneath said runway, rolls disposed with their axes parallel to said belt and spaced therefrom so as to permit the passage of fruit or nuts therethrough, vertically adjustable means for supporting the upper leaf of said belt, a mounting therefor, and a rockable member operating on said mounting for adjusting the spaced relation of the supporting means and the said rolls.

5. In a fruit sizer and grader, the combination with an open bottomed runway, of a belt positioned to travel longitudinally beneath said runway, rolls disposed with their axes parallel to said belt and spaced therefrom so as to permit the passage of fruit or nuts therethrough, vertically adjustable means for supporting the upper leaf of said belt, a mounting therefor, a rockable member operating on said mounting for adjusting the spaced relation of the supporting means and the said rolls, and means for retaining the supporting means in various adjusted positions.

6. In a fruit and nut sizer, the combination with an open-bottomed runway, of a belt disposed to travel longitudinally beneath said runway, rolls disposed with their axes parallel to said belt and spaced therefrom so as to permit the passage of fruit or nuts therethrough, a vertically adjustable supporting bar extending beneath the upper leaf of said belt, a pair of rods on which said bar is mounted, a hand lever, a rockable member, and connections between said rockable member and said rods, whereby movement of said rockable member will operate to effect a movement of said rods to adjust the position of said supporting bar.

7. In a fruit sizer and grader, the combination with an open-bottomed runway, of a belt mounted to travel longitudinally beneath said runway, rolls disposed with their axes parallel to said belt and spaced therefrom so as to permit the passage of fruit or nuts therethrough, a vertically adjustable supporting bar extending beneath the upper leaf of said belt, a pair of horizontally extending spaced rods on which said bar is mounted, a rockable member, and connections between said rockable member and the ends of said rods whereby movement of said rockable member will effect a vertical movement of said rods and the bar carried thereon.

8. In a fruit sizer and grader, the combination with an open-bottomed runway, of a belt mounted to travel longitudinally beneath said runway, rolls disposed with their axes parallel to said belt and spaced therefrom so as to permit the passage of fruit or nuts therethrough, a vertically adjustable supporting bar extending beneath the upper leaf of said belt, a pair of horizontally extending spaced rods on which said bar is mounted, a rockable member, and connections between said rockable member and the ends of said rods whereby movement of said rockable member will effect a vertical movement of said rods and the bar carried thereon, and means for locking said rods in various adjusted positions.

9. In a fruit and nut sizer, the combination with an open-bottomed runway, of a belt mounted to travel beneath said runway, rolls disposed with their axes parallel to said belt and spaced therefrom so as to permit the passage of fruit or nuts therethrough, a vertically adjustable bar arranged to support the upper leaf of said belt, a pair of rods on which said bar is mounted, a rock shaft, and connections between said rock shaft and the ends of said rods, whereby rocking of said rock shaft will effect movement of said rods to adjust the horizontal plane of the bar thereon.

10. In a fruit and nut sizer, the combination with an open bottomed runway, of a belt mounted to travel beneath said runway, rolls disposed with their axes parallel to said belt and spaced therefrom so as to permit the passage of fruit or nuts therethrough, a vertically adjustable bar arranged to support the upper leaf of said belt, a pair of rods on which said bar is mounted, a rock shaft, connections between said rock shaft and the ends of said rods, whereby rocking of said rock shaft will effect movement of said rods to adjust the horizontal plane of the bar thereon, and means for holding said bar in various adjusted positions.

11. In a fruit and nut sizer, the combination with an open bottomed runway, of a belt positioned to travel longitudinally beneath said runway, rolls disposed with their axes parallel to said belt and spaced therefrom so as to permit the passage of fruit or nuts therethrough, a vertically adjustable horizontal bar extending beneath the upper leaf of said belt for supporting same, a pair of spaced horizontal extending rods on which said bar is mounted, a rock shaft, bell crank levers on said rock shaft, connections between said bell crank levers and the ends of one of the rods, connecting rods attached to said bell-crank levers, a second pair of bell crank levers to which said connecting rods are attached, connections between said second pair of bell crank levers and the other rod, and means whereby the rock shaft may be manually actuated to effect vertical adjustment of said rods and the bar thereon.

12. In a fruit and nut sizer, the combination with an open bottomed runway, of a belt positioned to travel longitudinally beneath said runway, rolls disposed with their axes parallel to said belt and spaced therefrom so as to permit the passage of fruit or nuts therethrough, a vertically adjustable horizontal bar extending beneath the upper leaf of said belt for supporting same, a pair of spaced horizontally extending rods on which said bar is mounted, a rock shaft, bell crank levers on said rock shaft, connections between said bell crank levers and the ends of one of the rods, connecting rods attached to said bell-crank levers, a second pair of bell crank levers to which said connecting rods are attached, connections between said second pair of bell crank levers and the other rod, means whereby the rock shaft may be manually actuated to effect vertical adjustment of said rods and the bar thereon, and means for holding the rock shaft against movement to retain the rods and bar in their vertical adjusted position.

13. In a fruit and nut sizer, the combination of a plurality of open bottomed runways, belts mounted to travel longitudinally beneath said runways, rolls disposed with their axes parallel to said belts and spaced therefrom so as to permit the passage of fruit or nuts therethrough, vertically adjustable bars extending beneath the upper leaf of said belts, a pair of spaced horizontally extending rods on which said bars are mounted, a rockable member and connections between said rockable member and the rods whereby the series of bars carried by said rods may be moved vertically in synchronism on actuating said rockable member, and means operable on said rockable member for retaining the bars in various adjusted positions.

In witness that we claim the foregoing we have hereunto subscribed our names this 24th day of January, 1915.

J. C. KEEBLER.
ROY I. SIBLEY.

Witnesses:
  E. I. RACKETT,
  MARGUERITE BATES.